United States Patent
Ham

(10) Patent No.: US 8,996,269 B2
(45) Date of Patent: Mar. 31, 2015

(54) VEHICLE SPEED CONTROL APPARATUS, VEHICLE SPEED CONTROL SYSTEM COMPRISING THE SAME AND VEHICLE SPEED CONTROL METHOD

(71) Applicant: Hyundai Mobis Co., Ltd., Seoul (KR)

(72) Inventor: Jun Ho Ham, Incheon (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/706,484

(22) Filed: Dec. 6, 2012

(65) Prior Publication Data

US 2014/0088849 A1   Mar. 27, 2014

(30) Foreign Application Priority Data

Sep. 26, 2012 (KR) .......................... 10-2012-0107248

(51) Int. Cl.
  *G06F 19/00* (2011.01)
  *G06F 17/00* (2006.01)
  *B60W 30/14* (2006.01)
  *B60W 10/06* (2006.01)
  *B60W 10/18* (2012.01)

(52) U.S. Cl.
  CPC ............. *G06F 17/00* (2013.01); *B60W 30/143* (2013.01); *B60W 30/146* (2013.01); *B60W 10/06* (2013.01); *B60W 10/18* (2013.01); *B60W 2520/10* (2013.01); *B60W 2550/22* (2013.01); *B60W 2550/402* (2013.01); *B60W 2720/10* (2013.01); *B60W 2720/106* (2013.01)
  USPC ......................................................... 701/70

(58) Field of Classification Search
  USPC ......................................................... 701/70
  See application file for complete search history.

(56) References Cited

U.S. PATENT DOCUMENTS

2010/0161195 A1   6/2010   Shin
2010/0204896 A1*  8/2010   Biondo et al. .................. 701/93

FOREIGN PATENT DOCUMENTS

DE     103 58 968 A1    7/2005
DE  10 2007 036 794 A1  2/2009
DE  10 2010 054 241 A1  6/2012

(Continued)

OTHER PUBLICATIONS

Korean Office Action issued Oct. 24, 2013 in counterpart Korean Patent Application No. 10-2012-0107248 (8 pages, in Korean).

(Continued)

*Primary Examiner* — Mary Cheung
*Assistant Examiner* — Anne Mazzara
(74) *Attorney, Agent, or Firm* — NSIP Law

(57) ABSTRACT

Disclosed is a vehicle speed control apparatus including: a speed limit information recognition unit recognizing a location and a speed limit of a speed limit point located in front of a vehicle; a storage unit stored with deceleration characteristic values including at least one driving characteristic; a deceleration characteristic select unit selecting the deceleration characteristic values corresponding to the location and the speed limit of the recognized speed limit point among the deceleration characteristic values stored in the storage unit; and a targeted acceleration calculation unit calculating a targeted acceleration necessary for a vehicle speed control up to the speed limit point based on the selected deceleration characteristic values. By this configuration, it is possible to precisely control the vehicle speed up to the speed limit point at an optimal speed.

20 Claims, 6 Drawing Sheets

(56) References Cited

FOREIGN PATENT DOCUMENTS

| | | |
|---|---|---|
| EP | 1 985 489 A2 | 10/2008 |
| EP | 2 161 699 A2 | 3/2010 |
| EP | 2 476 597 A1 | 7/2012 |
| JP | 10-2746 | 1/1998 |
| JP | 2002-123897 | 4/2002 |
| JP | 2004-175148 | 6/2004 |
| JP | 2004-217175 | 8/2004 |
| JP | 2006-175956 | 7/2006 |
| JP | 2008-186265 | 8/2008 |
| JP | 2009-179168 | 8/2009 |
| JP | 2009-280100 | 12/2009 |
| KR | 10-2007-0012527 | 1/2007 |
| KR | 10-2008-0015222 | 6/2008 |
| KR | 10-2008-0073831 | 8/2008 |
| KR | 10-2008-0078600 | 8/2008 |
| KR | 10-2012-0022377 | 3/2012 |
| KR | 10-2012-0053899 | 5/2012 |
| WO | WO 2009/106852 A1 | 9/2009 |

OTHER PUBLICATIONS

European Search Report mailed Mar. 26, 2014 in counterpart European Application No. 12195923.3 (5 pages, in English).

* cited by examiner

Fig. 2

| DECELERATION CHARACTERISTIC VALUE [m/s²] | MAXIMUM ALLOWABLE ACCELERATION [m/s²] | MAXIMUM JERK [m/s³] | SPEED PROPORTIONAL GAIN [s⁻¹] | EXTRA SPEED [m/s] | |
|---|---|---|---|---|---|
| 1 | 0.50 | 0.3 | 0.3 | 0.3 | |
| 2 | 0.75 | 0.4 | 0.4 | 0.4 | → START CONTROL |
| 3 | 1.00 | 0.5 | 0.5 | 0.5 | |
| 4 | 1.25 | 0.6 | 0.6 | 0.6 | |
| ... | ... | ... | ... | ... | |
| 10 | 2.50 | 1.5 | 1.3 | 0.7 | → WARNING |
| 11 | 3.00 | 2.0 | 1.5 | 1.0 | |
| 12 | 4.00 | 2.5 | 2.0 | 1.2 | |

Column group header: DRIVING CHARACTERISTICS (spans Maximum Allowable Acceleration, Maximum Jerk, Speed Proportional Gain, Extra Speed)

VEHICLE SPEED CONTROL APPARATUS, VEHICLE SPEED CONTROL SYSTEM COMPRISING THE SAME AND VEHICLE SPEED CONTROL METHOD

CROSS-REFERENCE TO RELATED APPLICATIONS

This application claims priority to and the benefit of Korean Patent Application No. 10-2012-0107248 filed in the Korean Intellectual Property Office on Sep. 26, 2012, the entire contents of which are incorporated herein by reference.

FIELD

The present disclosure relates to a vehicle speed control apparatus, a vehicle speed control system comprising the same, and a vehicle speed control method, and more particularly, to a vehicle speed control apparatus controlling a vehicle speed in response to speed limit information, a vehicle speed control system comprising the same, and a vehicle speed control method.

BACKGROUND

A smart cruise control (hereinafter, referred to as SCC) is an apparatus for automatically controlling a vehicle speed without directly operating an acceleration pedal or a brake pedal by a driver by sensing a distance and a relative speed of a front vehicle, front road information, and the like.

In order to implement the SCC, it is essential to effectively perform an acceleration and deceleration control of a vehicle. Therefore, a technology of performing an acceleration and deceleration control of a vehicle corresponding to external information has been variously proposed. In particular, in Korean Patent Application No. 10-2010-0085932, a technology of decelerating a vehicle has been proposed by controlling a brake in response to the speed limit sensed by navigation. However, since the present technology immediately performs brake control at the time of sensing a speed limit, there is a problem in that the deceleration is performed at a point far away from a speed limit point, which degrades the overall driving speed. The present technology has not yet proposed a method for controlling deceleration of a vehicle and cannot solve a problem of degradation of a comfortable ride according to an increase in deceleration.

The general acceleration and deceleration control of a vehicle that has been proposed in technologies other than the present technology does not consider the current acceleration of the corresponding vehicle other than the front road information. Therefore, it is difficult to ensure a comfortable ride and precisely control an optimal vehicle speed at an appropriate speed within a required distance.

SUMMARY

The present invention has been made in an effort to provide a vehicle speed control apparatus for precisely performing a vehicle speed control corresponding to driving situations and driving characteristics, a vehicle speed control system, and a control method thereof, in an SCC system of a vehicle.

The present invention has also been made in an effort to provide a vehicle speed control apparatus minimizing degradation of a comfortable ride for a driver during a deceleration process, a vehicle speed control system, and a control method thereof.

The present invention has also been made in an effort to provide a vehicle speed control apparatus for determining and warning when a proper speed cannot be observed within a remaining distance due to a limit of set operation conditions, a vehicle speed control system, and a control method thereof.

An exemplary embodiment of the present invention provides a vehicle speed control apparatus, including: a speed limit information recognition unit recognizing a location and a speed limit of a speed limit point located in front of a vehicle; a storage unit stored with deceleration characteristic values including at least one driving characteristic; a deceleration characteristic select unit selecting the deceleration characteristic values corresponding to the location and the speed limit of the recognized speed limit point among the deceleration characteristic values stored in the storage unit; and a targeted acceleration calculation unit calculating a targeted acceleration necessary for a vehicle speed control up to the speed limit point based on the selected deceleration characteristic values.

The speed limit information recognition unit may receive information on the vehicle from a global positioning system (GPS) and include a navigation unit in which road information including the speed limit point is stored.

The deceleration characteristic select unit may sequentially reflect the deceleration characteristic values to calculate a deceleration distance necessary for deceleration from a current vehicle speed to the speed limit and compare a residual distance up to the speed limit point with the calculated deceleration distance to select the corresponding deceleration characteristic values if it is determined that the deceleration distance is longer than the residual distance.

The deceleration characteristic select unit may calculate a first deceleration distance that is included in the deceleration distance and is in a section in which deceleration is increased, based on the current acceleration of a vehicle.

The deceleration characteristic select unit may calculate a second deceleration distance that is included in the deceleration distance and is in a section in which deceleration is constant.

The deceleration characteristic select unit may calculate a third deceleration distance that is included in the deceleration distance and is in a section in which deceleration is reduced.

The driving characteristics may be at least any one of a maximum allowable acceleration of the targeted acceleration, a maximum jerk of the targeted acceleration, a speed control gain, and an extra speed that is a difference between the speed limit and a targeted control speed.

Another exemplary embodiment of the present invention provides a vehicle speed control method, including: a) recognizing a location and a speed limit of a speed limit point located in front of a vehicle; b) selecting deceleration characteristic values corresponding to the location and the speed limit of the speed limit point among deceleration characteristic values including at least one driving characteristic; and c) calculating a targeted acceleration necessary for a vehicle speed control up to the speed limit point based on the selected deceleration characteristic values.

Step (b) of the vehicle speed control method may include: b-1) calculating a deceleration distance necessary for deceleration from a current vehicle speed to the speed limit by reflecting the deceleration characteristic values; b-2) comparing a residual distance up to the speed limit point with the calculated deceleration distance; and b-3) if it is determined that the deceleration distance is longer than the residual distance, selecting the corresponding deceleration characteristic values.

The driving characteristics of the vehicle speed control method may be at least any one of a maximum allowable acceleration of the targeted acceleration, a maximum jerk of the targeted acceleration, a speed control gain, and an extra speed that is a difference between the speed limit and a targeted control speed.

Yet another exemplary embodiment of the present invention provides a vehicle speed control system, including: a first vehicle speed control apparatus recognizing a speed limit of a speed limit point located in front of a vehicle, selecting deceleration characteristic values corresponding to a location and a speed limit of the speed limit point among deceleration characteristic values including at least one driving characteristic, and calculating a first targeted acceleration necessary for a vehicle speed control up to the speed limit point based on the selected deceleration characteristic values; a second vehicle speed control apparatus calculating a second targeted acceleration necessary for a vehicle speed control set by a user or a vehicle speed control so as to maintain an inter-vehicular distance for a preceding vehicle; and a targeted acceleration determining unit determining a final targeted acceleration based on the calculated first targeted acceleration and second targeted acceleration. The first speed limit recognition unit of the vehicle speed control system may receive information on the vehicle from a global positioning system (GPS) and include a navigation unit in which road information including the speed limit point is stored.

The vehicle speed control system may further include: an activation determining unit controlling whether the first vehicle speed control unit is activated, based on activation information received by the first vehicle speed control apparatus and the second vehicle speed control apparatus.

The activation information of the vehicle speed control system may be at least any one of the number of global positioning system (GPS) satellites received by the navigation unit, validity of information of the navigation unit, whether the first vehicle speed control apparatus set by a driver is activated, and whether the current second vehicle speed control apparatus is activated.

The deceleration characteristic select unit of the vehicle speed system may sequentially reflect the deceleration characteristic values to calculate a deceleration distance necessary for deceleration from a current vehicle speed to the speed limit and compare a residual distance up to the speed limit point with the calculated deceleration distance to select the corresponding deceleration characteristic values if it is determined that the deceleration distance is longer than the residual distance.

The driving characteristics of the vehicle speed control system may be at least any one of a maximum allowable acceleration of the targeted acceleration, a maximum jerk of the targeted acceleration, a speed control gain, and an extra speed that is a difference between the speed limit and a targeted control speed.

The targeted acceleration select unit may determine one having a smaller value of the calculated first targeted acceleration and second targeted acceleration as a final targeted acceleration.

According to the vehicle speed control apparatus, the vehicle speed control system, the control method thereof, and the vehicle speed control method of the exemplary embodiment of the present invention, it is possible to precisely control the vehicle speed at an optimal speed up to the speed limit point by reflecting deceleration characteristics according to the driving situations or the driving characteristics.

According to the vehicle speed control apparatus, the vehicle speed control system, the control method thereof of the exemplary embodiment of the present invention, it is possible to minimize degradation of a comfortable ride for a driver according to the deceleration by reflecting the driving characteristics, such as the maximum allowable acceleration, the maximum jerk, and the like, to the vehicle speed control.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2 is a table illustrating driving characteristics corresponding to each deceleration characteristic value.

Figure 1:
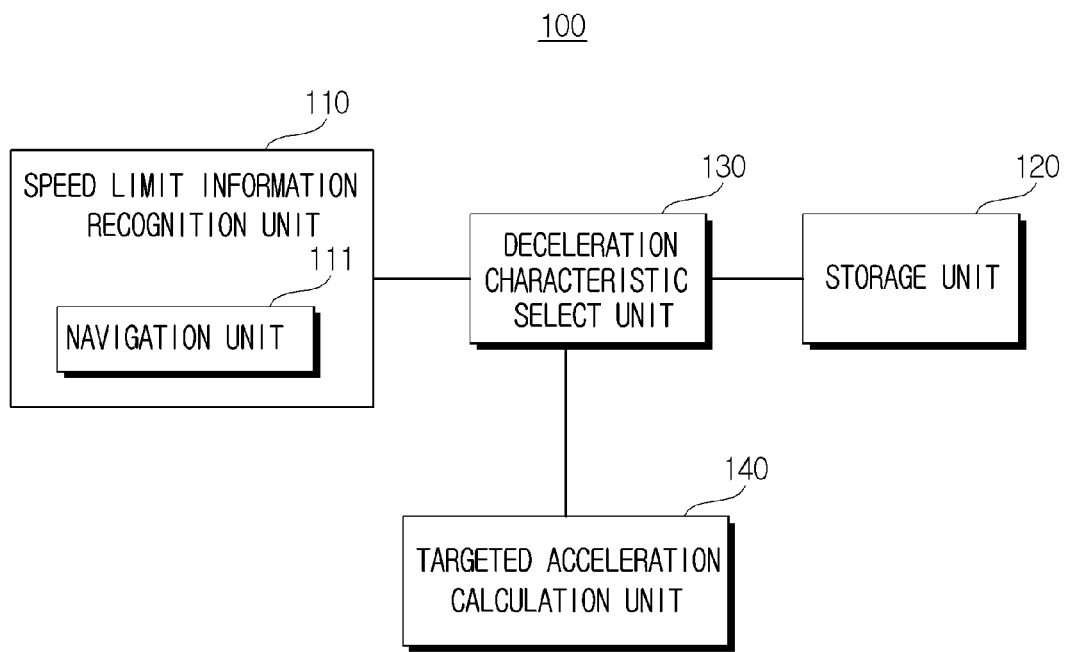
FIG. 1 is a diagram illustrating a vehicle speed control apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. It is to be noted that in adding reference numerals to elements of each drawing, like reference numerals refer to like elements even though like elements are shown in different drawings. The exemplary embodiment of the present invention will be described below, but the technical idea of the present invention is not limited thereto and is modified and can be variously practiced by those skilled in the art.

Hereinafter, an exemplary embodiment of the present invention is based on a technology of controlling a vehicle speed up to a speed limit point by reflecting a speed limit obtained from a navigation unit while driving a vehicle using an SCC system.

FIG. 1 is a diagram illustrating a vehicle speed control apparatus 100 according to an exemplary embodiment of the present invention.

Referring to FIG. 1, the vehicle speed control apparatus 100 according to the exemplary embodiment of the present invention includes a speed limit information recognition unit 110, a storage unit 120 in which deceleration characteristic values are stored, a deceleration characteristic select unit 130, and a targeted acceleration calculation unit 140.

First, the speed limit information recognition unit 110 serves to recognize a speed limit point located in front of a vehicle and recognize a location and a speed limit of a sensed speed limit point. In one exemplary embodiment, the speed limit information recognition unit 110 may include a navigation unit 111. The navigation unit 111 receives location information of a current vehicle from a global positioning system (GPS). The navigation unit 111 is stored with road information including the speed limit point.

The storage unit 120 is stored with the deceleration characteristic values including at least one driving characteristic. FIG. 2 is a table illustrating driving characteristics corresponding to each deceleration characteristic value. Referring to FIG. 2, in one exemplary embodiment, the driving characteristics may mean a maximum allowable acceleration of targeted acceleration, a maximum jerk of the targeted acceleration, a speed control gain, an extra speed that is a difference between a speed limit and a targeted control speed, and the like. Here, the targeted acceleration means acceleration required to observe the speed limit at the speed limit point of the corresponding vehicle in consideration of a distance from a current driving point to the speed limit point. Four driving characteristics are described in FIG. 2 and the foregoing description, but the driving characteristics of the exemplary embodiment of the present invention are not limited thereto and may be changed to various factors determining the driving characteristics.

The driving characteristics having predetermined values are grouped to form sets. The sets of the driving characteristics each correspond to deceleration characteristic values (1, 2, 3, . . . , 12 of FIG. 2). Therefore, aspects of the deceleration control may be changed according to each deceleration characteristic value. The driving characteristic values are used as input values when a deceleration distance is calculated by applying the corresponding deceleration characteristics. For example, referring to FIG. 2, when the deceleration characteristic value is selected to be "2", the maximum allowable acceleration of the targeted acceleration is limited to 0.75 m/s, the maximum jerk of the targeted acceleration is limited to 0.40/s, the speed control gain is set to be 0.4 s~I, and the extra speed is input as 0.4 m/s, upon calculating the targeted acceleration of a vehicle up to a speed limit point. Here, the deceleration distance means a distance required for deceleration up to the speed limit from the current vehicle speed. The extra speed Vm means a difference between a speed limit Vt and a targeted control speed Vmap.

Figure 3:
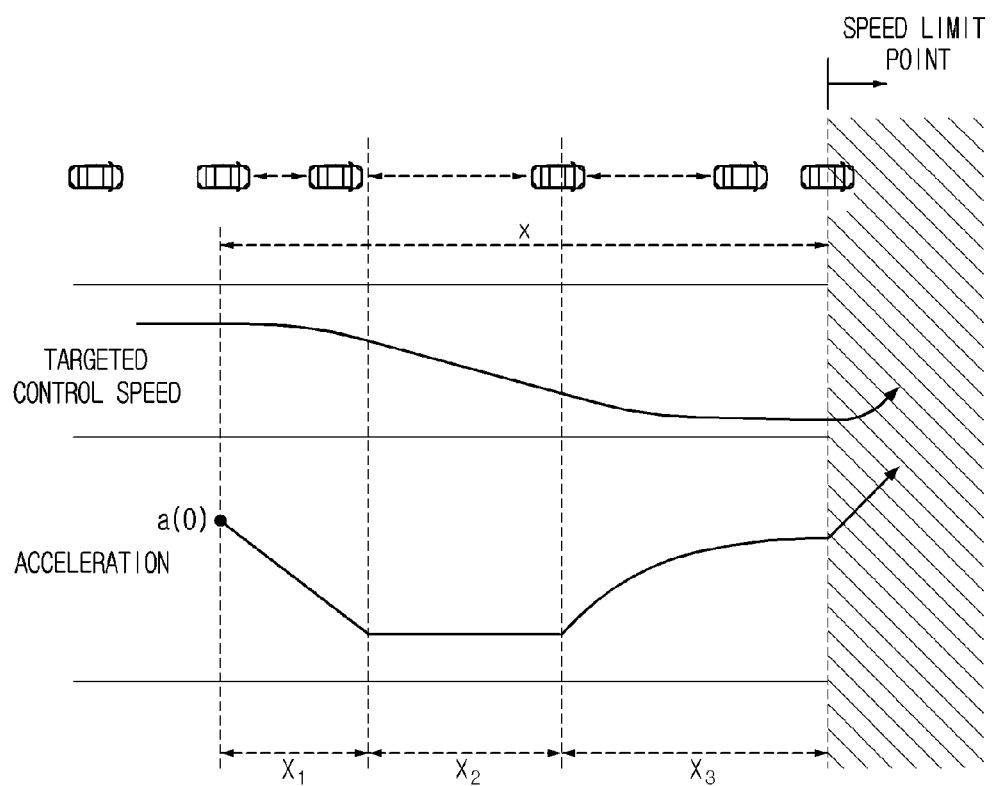
FIG. 3 is a diagram illustrating a deceleration distance and deceleration state for each section of the deceleration distance.

The deceleration characteristic select unit 130 selects any one of the deceleration characteristic values stored in the storage unit 120, corresponding to the location and the speed limit of the speed limit point recognized by the foregoing speed limit information recognition unit 110. FIG. 3 is a diagram illustrating a deceleration distance and deceleration state for each section of the deceleration distance. In the exemplary embodiment of the present invention, the deceleration characteristic select unit 130 first reflects the predetermined deceleration characteristic value (for example, "2") to calculate the deceleration distance x. The deceleration distance may be represented by a distance with three types of deceleration sections.

First, the deceleration distance x may include a first deceleration distance x1 in a section in which the deceleration is increased. The deceleration characteristic select unit 130 receives the current acceleration of a vehicle from a vehicle speed sensor and calculates the first deceleration distance x1 based on the received acceleration. First, when the targeted acceleration is limited, it is determined based on the following Equation 1 whether a proportional control deceleration section is present.

$$v_{map} - v(0) - \frac{a(0)}{K_m(n)} < 0 \qquad \text{[Equation 1]}$$

In the above Equation 1, vmap is the targeted control speed, v(0) is the current vehicle speed, n is a deceleration characteristic value, a(0) is the current acceleration of a vehicle, and km(n) is a speed control gain of the corresponding deceleration characteristic value.

When satisfying the Equation 1, it is determined that the proportional control deceleration section is present by inputting the driving characteristics of the corresponding deceleration characteristic value and when not satisfying the above Equation 1, it is determined that no proportional control deceleration section is present. If it is determined that the proportional control deceleration section is present, a first virtual arrival time t1 is calculated based on the following Equation 2.

$$\frac{J_{max}(n)}{2} \cdot t_1^{*2} + \left(\frac{J_{max}(n)}{K_m(n)} - a(0)\right) \cdot t_1^* + \qquad \text{[Equation 2]}$$

$$\left(v_{map} - v(0) - \frac{a(0)}{K_m(n)}\right) = 0$$

In the above Equation 2, Jmax(n) is the maximum jerk of the corresponding deceleration characteristic value, a(0) is the current acceleration of a vehicle, n is the deceleration characteristic value, km(n) is the speed control gain of the corresponding deceleration characteristic value, vmap is the targeted control speed, and v(0) is the current vehicle speed.

Meanwhile, since the section in which no proportional control deceleration section is present and the deceleration is constant can immediately appear, there is a need to determine the section. A second virtual arrival time t1 is calculated based on the following Equation 3.

$$t_1^{**}(n) = \frac{a(0) + a_{max}(n)}{J_{max}(n)} \qquad \text{[Equation 3]}$$

In the above Equation 3, a(0) is the current acceleration of a vehicle, n is the deceleration characteristic value, amax(n) is the maximum allowable acceleration of the corresponding deceleration characteristic value, and Jmax(n) is the maximum jerk of the corresponding deceleration characteristic value.

One having a smaller value of the first virtual arrival time t1 and the second virtual arrival time t1 obtained based on the above Equations 1 and 2 is determined as the first arrival time t1 for obtaining the first deceleration distance x1. The acceleration at the ending point of the section in which deceleration is increased may be obtained using the first arrival time t1 and may be integrated to obtain the first deceleration distance x1. In detail, the first deceleration distance x1 is calculated based on the following Equation 4.

$$x_1(n) = v(0) \cdot t_1(n) + \frac{a(0)}{2} \cdot t_1(n)^2 - \frac{J_{max}(n)}{6} \cdot t_1(n)^3 \qquad \text{[Equation 4]}$$

In the above Equation 4, v(0) is the current vehicle speed, n is the deceleration characteristic value, t1(n) is the first arrival time up to an ending point of the section in which the deceleration is increased at the corresponding deceleration characteristic value, a(0) is the current acceleration of a vehicle, and Jmax(n) is the maximum jerk of the corresponding deceleration characteristic value.

Second, the deceleration distance x may include a second deceleration distance x2 in the section in which the deceleration is constant. The deceleration characteristic select unit 130 receives the current acceleration of a vehicle from the vehicle speed sensor and calculates the second deceleration distance x2 based on the received acceleration. First, it is determined whether the section in which the deceleration is constant is present. To this end, an expected speed v of the ending time of the section in which the deceleration is constant is calculated based on the following Equation 5.

$$v^*(n) = v_{map} + \frac{a_{max}(n)}{K_m(n)} \qquad \text{[Equation 5]}$$

In the above Equation 5, vmap is the targeted control speed, amax(n) is the maximum allowable acceleration of the corresponding deceleration characteristic value, and Km(n) is the speed control gain of the corresponding deceleration characteristic value.

When the calculated expected speed v is equal to or larger than a vehicle speed v(t1) of the ending time of the proportional control deceleration section, it is determined that no equivalent deceleration section is present. When the calculated expected speed V is smaller than the vehicle speed v(t1) of the ending point in the section in which the deceleration is increased, a second arrival time t2 up to the ending point of the section in which the deceleration is constant is calculated based on the following Equation 6.

$$t_2(n) = \frac{v(t_1, n) - v^*(n)}{a_{max}(n)} \qquad \text{[Equation 6]}$$

In the above Equation 6, v(t1, n) is the vehicle speed of the ending time of the proportional control deceleration section at the corresponding deceleration characteristic value, v is the expected speed of the ending time of the section in which the deceleration is constant, and amax(n) is the maximum allowable acceleration of the corresponding deceleration characteristic value.

The speed at the ending point of the section in which deceleration may be obtained using the second arrival time t2 is constant and may be integrated to obtain the second deceleration distance x2. In detail, the second deceleration distance x2 is calculated based on the following Equation 7. When no equivalent deceleration section is present, the second deceleration distance x2 becomes 0.

$$x_2(n) = v(t_1, n) \cdot t_2(n) - \frac{a_{max}(n)}{2} \cdot t_2(n)^2 \qquad \text{[Equation 7]}$$

In the above Equation 7, v(t1, n) is the vehicle speed of the ending time of the proportional control deceleration section at the corresponding deceleration characteristic value, t2 is the second arrival time, and the amax(n) is the maximum allowable acceleration of the corresponding deceleration characteristic value.

Third, the deceleration distance x may include a third deceleration distance x3 in the proportional control section in which the deceleration is reduced. The deceleration characteristic select unit 130 first determines the section in which the deceleration is increased. To this end, it is determined based on the following Equation 8 that the control error between the vehicle speed v(t2) of the ending time in the section in which the deceleration is constant and the targeted control speed vamp is less than the extra speed Vm. As the determination result, when the control error is less than the extra speed Vm, it is considered that the control target is completed and a third arrival time t3 up to the ending time of the section in which the deceleration is reduced is considered to be 0. In other words, it is determined that the section in which the deceleration is reduced is not present. When the control error exceeds the extra speed Vm, the third arrival time t3 up to the ending point of the section in which the deceleration is reduced is calculated based on the following Equation 8.

$$t_3^*(n) = \frac{-1}{K_m(n)} \cdot \ln \frac{v_m(n)}{v(t_2, n) - v_{map}} \qquad \text{[Equation 8]}$$

In the above Equation 8, Km(n) is the speed control gain of the corresponding deceleration characteristic value, Vm is the extra speed, v(t2, n) is the vehicle speed of the ending point of the equivalent deceleration section at the corresponding deceleration characteristic value, and vmap is the targeted control speed.

The third deceleration distance x3 is calculated based on the following Equation 9.

$$x_3(n) = v_{map} \cdot t_3(n) + (v(t_2, n) - v_{map}) \cdot (1 - e^{-k_m(n) \cdot t_3(n)}) \qquad \text{[Equation 9]}$$

In the above Equation 9, vmap is the targeted control speed, n is the deceleration characteristic value, t3(n) is the third arrival time at the corresponding deceleration characteristic value, v(t2, n) is the vehicle speed of the ending time of the section in which the deceleration is constant at the corresponding deceleration characteristic value, and Km(n) is the speed control gain of the corresponding deceleration characteristic value.

Meanwhile, the deceleration distance x corresponds to a distance obtained by summing the foregoing first deceleration distance x1, second deceleration distance x2, and third deceleration distance x3.

The deceleration distance x calculated as described above is compared with the residual distance up to the speed limit point. Here, the residual distance means the current location of the vehicle and the distance up to the speed limit point and is obtained from the navigation unit 111. In this case, the vehicle speed control period of the vehicle speed control apparatus 100 may be faster than the information update period of the navigation unit 111. Therefore, the residual distance obtained from the navigation unit 111 may be corrected by the predetermined algorithm.

The deceleration characteristic select unit 130 calculates the deceleration distance x by sequentially reflecting the next deceleration characteristic value (for example, "3") when the deceleration distance x is shorter than the residual distance, as described above. A process of calculating the deceleration distance x by sequentially reflecting the next deceleration characteristic values ("4", "5", . . . ) until it is determined that the deceleration distance x is longer than the residual distance is repeatedly performed.

The deceleration characteristic select unit 130 selects the deceleration characteristic value when it is determined that the deceleration distance x is longer than the residual distance.

Meanwhile, the deceleration characteristic select unit 130 may be configured to issue a warning to a driver when the selected deceleration characteristic value is a predetermined reference value (for example, "10") or more.

The targeted acceleration calculation unit 140 calculates the targeted acceleration based on the deceleration characteristic value selected by the foregoing deceleration characteristic select unit 130. In the exemplary embodiment of the present invention, the targeted acceleration calculation unit 140 calculates a targeted acceleration ai based on the following Equation 9.

$$a_i = K_m(v_{map} - v(0))$$ [Equation 10]

In the above Equation 10, Km is the speed control gain, vamp is the targeted control speed, and v(0) is the current vehicle speed. In this case, the targeted acceleration ai limits a value by applying the selected acceleration limit and the jerk limit.

Hereinafter, the vehicle speed control method using the foregoing vehicle speed control apparatus 100 will be described with reference to FIGS. 4 and 5.

Figure 4:
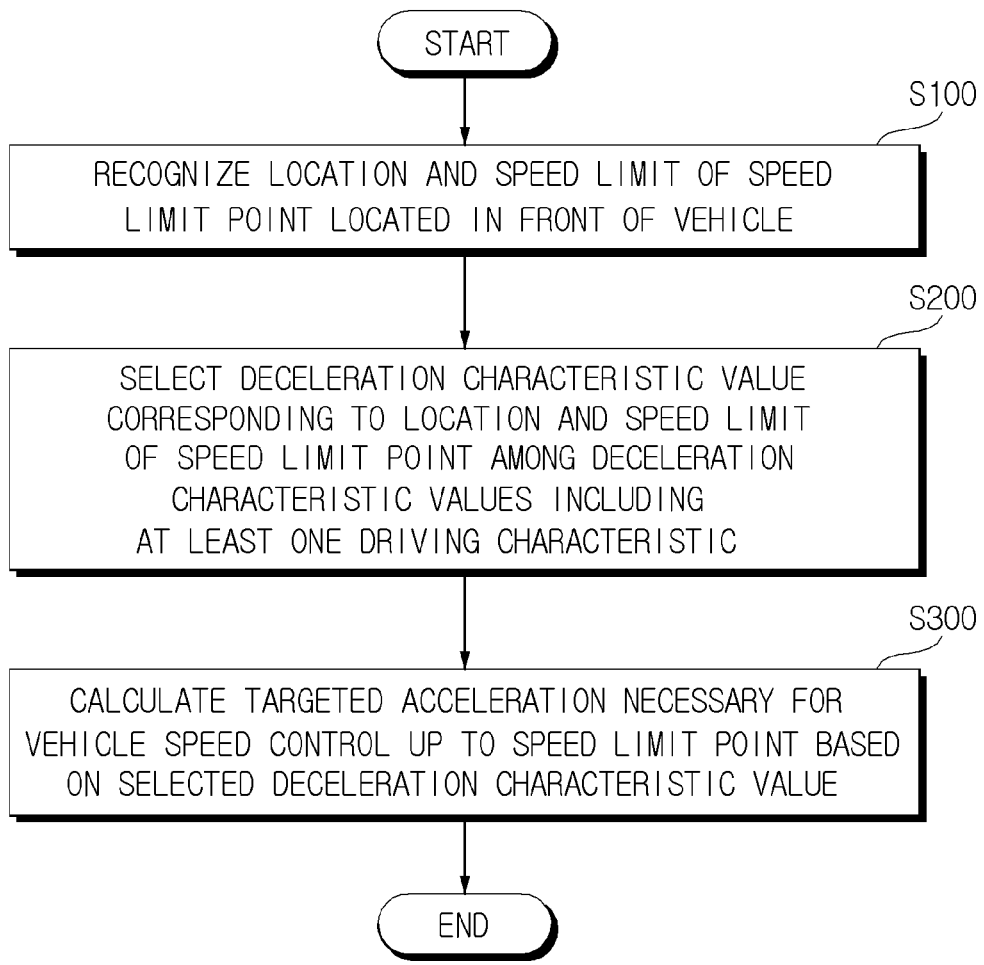
FIG. 4 is a flow chart illustrating a vehicle speed control method according to an exemplary embodiment of the present invention.
Figure 5:
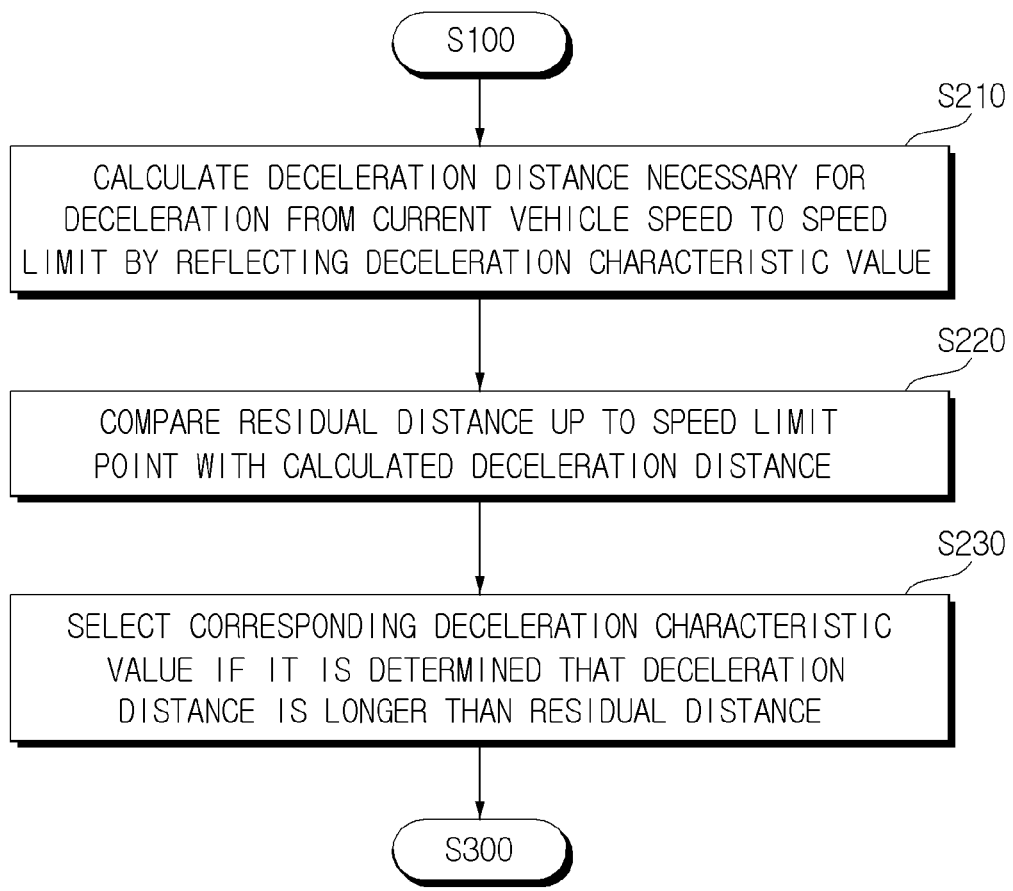
FIG. 5 is a flow chart illustrating a method for selecting deceleration characteristic values.

FIG. 4 is a flow chart illustrating a vehicle speed control method according to an exemplary embodiment of the present invention and FIG. 5 is a flow chart illustrating a method for selecting deceleration characteristic values.

Referring to FIGS. 4 and 5 together, the speed limit information recognition unit 110 recognizes the location and the speed limit of the speed limit point located in front of a vehicle (S100). In particular, the residual distance from the current location of a vehicle to the speed limit point may be calculated by the location of the recognized speed limit point.

Next, the deceleration characteristic select unit 130 selects the deceleration characteristic values from the storage unit 120. The deceleration characteristic value performing the optimal deceleration is selected while repeatedly performing a process of sequentially inputting the deceleration characteristic value, starting from the predetermined deceleration characteristic value. To this end, first, the deceleration distance x=x1+x2+x3 that is required to decelerate from the current vehicle speed to the speed limit is calculated by reflecting the predetermined deceleration characteristic value (S210). When the deceleration distance x=x1+x2+x3 is shorter than the residual distance by comparing the calculated deceleration distance x1+x2+x3 with the residual distance (S220), a process of sequentially reflecting next deceleration characteristic values until the calculated deceleration distance x=x1+x2+x3 is longer than the residual distance is repeated. If it is determined that the calculated deceleration distance x=x1+x2+x3 is longer than the residual distance, the corresponding deceleration characteristic values are selected (S230).

Next, the targeted acceleration calculation unit 140 calculates the targeted acceleration necessary for the vehicle speed control up to the speed limit point based on the selected deceleration characteristic value (S300).

Hereinafter, a vehicle control system 10 including the foregoing vehicle speed control apparatus 100 and using the vehicle speed control apparatus 100 associated with the existing SCC system will be described.

Figure 6:
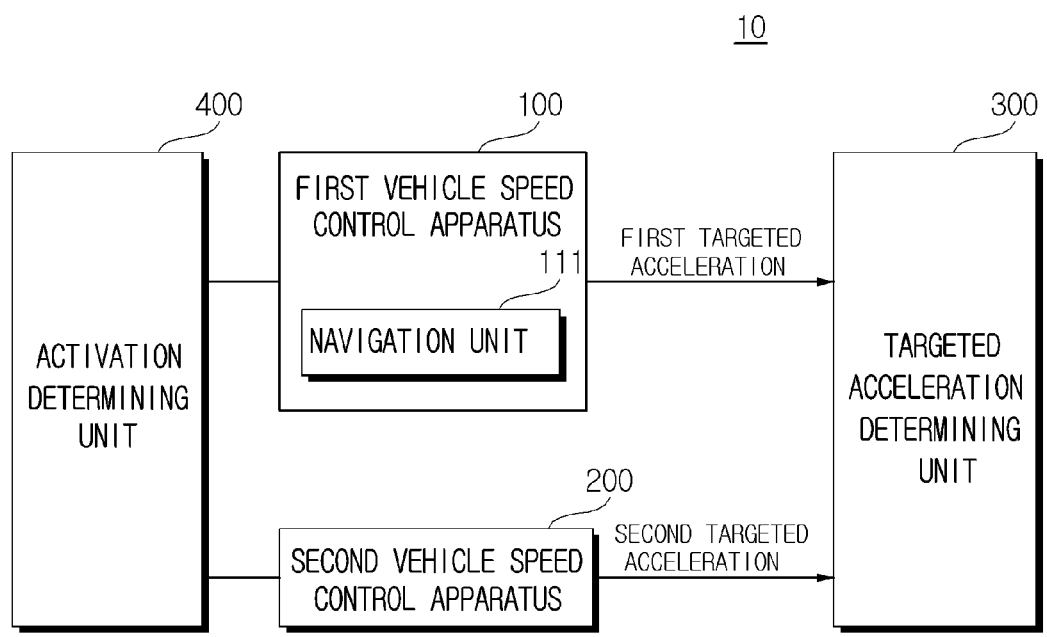
FIG. 6 is a diagram illustrating a vehicle speed control system according to the exemplary embodiment of the present invention.

FIG. 6 is a diagram illustrating the vehicle speed control apparatus 10 according to an exemplary embodiment of the present invention.

Referring to FIG. 6, the vehicle speed control system 10 according to the exemplary embodiment of the present invention includes a first vehicle speed control apparatus 100, a second vehicle speed control apparatus 200, a targeted acceleration determining unit 300, and an activation determining unit 400. In the exemplary embodiment of the present invention, the vehicle speed control system 10 may perform the vehicle speed control reflecting the deceleration characteristic values by the first vehicle speed control apparatus 100 in the SCC state performed by the second vehicle speed control apparatus 200.

First, the first vehicle speed control apparatus 100 illustrates the foregoing vehicle speed control apparatus 100 and the configuration and control process thereof are described above, but the detailed description thereof will be omitted. The first vehicle speed control apparatus 100 obtains the location and the speed limit of the speed limit point from the navigation and reflects the deceleration characteristic values based on the obtained location and speed limit to calculate a first targeted acceleration.

Meanwhile, the second vehicle speed control apparatus 200 uses the vehicle sensor including a radar, and the like, to sense the speed limit of the front road and calculate a second targeted acceleration based on the speed limit.

The targeted acceleration determining unit 300 determines a final targeted acceleration based on the calculated first targeted acceleration and second targeted acceleration. In the exemplary embodiment of the present invention, the targeted acceleration determining unit 300 may select any one of the first targeted acceleration and the second targeted acceleration to determine the final targeted acceleration. In particular, one having a smaller value of the first targeted acceleration and the second targeted acceleration may be determined as the final targeted acceleration.

The activation determining unit 400 serves to activate the first vehicle speed control apparatus 100 in the state in which the SCC is performed by the second vehicle speed control apparatus 120 to determine whether the additional vehicle speed control is performed. The activation determining unit 400 determines the vehicle speed control based on the activation information received from the first vehicle speed control apparatus 100 or the second vehicle speed control apparatus 120. The activation information may be the number of global positioning system (GPS) satellites received by the navigation unit 111, validity of information of the navigation unit 111, whether the first vehicle speed control apparatus 100 set by a driver is activated, and whether the current second vehicle speed control apparatus is activated, and the like. As described above, when all the activation information is satisfied, the activation determining unit 400 may perform the additional vehicle speed control process using the first vehicle speed control apparatus 100.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A vehicle speed control apparatus, comprising:
 a speed limit information recognition unit recognizing a location and a speed limit of a speed limit point located in front of a vehicle;
 a storage unit stored with deceleration characteristic values including at least one driving characteristic;
 a deceleration characteristic select unit selecting the deceleration characteristic values corresponding to the location and the speed limit of the recognized speed limit point among the deceleration characteristic values stored in the storage unit; and
 a targeted acceleration calculation unit calculating a targeted acceleration necessary for a vehicle speed control up to the speed limit point based on the selected deceleration characteristic values.

2. The vehicle speed control apparatus of claim 1, wherein the speed limit information recognition unit receives information on the vehicle from a global positioning system (GPS) and includes a navigation unit in which road information including the speed limit point is stored.

3. The vehicle speed control apparatus of claim 1, wherein the deceleration characteristic select unit sequentially reflects the deceleration characteristic values to calculate a deceleration distance necessary for deceleration from a current vehicle speed to the speed limit and compares a residual distance up to the speed limit point with the calculated deceleration distance to select the corresponding deceleration characteristic values if it is determined that the deceleration distance is longer than the residual distance.

4. The vehicle speed control apparatus of claim 3, wherein the deceleration characteristic select unit calculates a first deceleration distance that is included in the deceleration distance and is in a section in which deceleration is increased, based on the current acceleration of a vehicle.

5. The vehicle speed control apparatus of claim 4, wherein the deceleration characteristic select unit calculates a second deceleration distance that is included in the deceleration distance and is in a section in which deceleration is constant.

6. The vehicle speed control apparatus of claim 5, wherein the deceleration characteristic select unit calculates a third deceleration distance that is included in the deceleration distance and is in a section in which deceleration is reduced.

7. The vehicle speed control apparatus of claim 1, wherein the driving characteristics are at least any one of a maximum allowable acceleration of the targeted acceleration, a maximum jerk of the targeted acceleration, a speed control gain, and an extra speed that is a difference between the speed limit and a targeted control speed.

8. The vehicle speed control apparatus of claim 1, further comprising a processor that comprises the speed limit information recognition unit, the storage unit, the deceleration characteristic select unit, and the targeted acceleration calculation unit.

9. A vehicle speed control method, comprising:
 sensing with a sensor a location and a speed limit of a speed limit point located in front of a vehicle;
 selecting from a storage memory deceleration characteristic values corresponding to the location and the speed limit of the speed limit point among deceleration characteristic values including at least one driving characteristic; and
 calculating a targeted acceleration necessary for a vehicle speed control up to the speed limit point based on the selected deceleration characteristic values.

10. The vehicle speed control method of claim 9, wherein the selecting includes:
 calculating a deceleration distance necessary for deceleration from a current vehicle speed to the speed limit by reflecting the deceleration characteristic values;
 comparing a residual distance up to the speed limit point with the calculated deceleration distance; and
 if it is determined that the deceleration distance is longer than the residual distance, selecting the corresponding deceleration characteristic values.

11. The vehicle speed control method of claim 9, wherein the driving characteristics are at least any one of a maximum allowable acceleration of the targeted acceleration, a maximum jerk of the targeted acceleration, a speed control gain, and an extra speed that is a difference between the speed limit and a targeted control speed.

12. A vehicle speed control apparatus, comprising:
 a speed limit information recognition sensor configured to recognize a location and a speed limit of a speed limit point located in front of a vehicle;
 a storage unit memory configured to store a table of deceleration characteristic values including at least one driving characteristic;
 a deceleration characteristic selector configured to select a deceleration characteristic value corresponding to the location and the speed limit of the recognized speed limit point from among the deceleration characteristic values stored in the storage memory; and
 a targeted acceleration calculator configured to calculate a targeted acceleration necessary for a vehicle speed control up to the speed limit point based on the selected deceleration characteristic value.

13. The vehicle speed control apparatus of claim 12, wherein the speed limit information recognition sensor is configured to receive information on the vehicle from a global positioning system (GPS) and includes a navigation unit in which road information including the speed limit point is stored.

14. The vehicle speed control apparatus of claim 12, wherein the deceleration characteristic selector is configured to sequentially reflect the deceleration characteristic values to calculate a deceleration distance necessary for deceleration from a current vehicle speed to the speed limit and to compare a residual distance up to the speed limit point with the calculated deceleration distance to select the corresponding deceleration characteristic values if it is determined that the deceleration distance is longer than the residual distance.

15. The vehicle speed control apparatus of claim 14, wherein the deceleration characteristic selector is configured to calculate a first deceleration distance that is included in the deceleration distance and is in a section in which deceleration is increased, based on the current acceleration of a vehicle.

16. The vehicle speed control apparatus of claim 15, wherein the deceleration characteristic selector is configured to calculate a second deceleration distance that is included in the deceleration distance and is in a section in which deceleration is constant.

17. The vehicle speed control apparatus of claim 16, wherein the deceleration characteristic selector is configured to calculate a third deceleration distance that is included in the deceleration distance and is in a section in which deceleration is reduced.

18. The vehicle speed control apparatus of claim 12, wherein the driving characteristics are at least any one of a maximum allowable acceleration of the targeted acceleration, a maximum jerk of the targeted acceleration, a speed control gain, and an extra speed that is a difference between the speed limit and a targeted control speed.

19. The vehicle speed control apparatus of claim 12, wherein the deceleration characteristic selector is configured to calculate a deceleration distance necessary for deceleration from a current vehicle speed to the speed limit based on the selected deceleration characteristic value, to compare a residual distance up to the speed limit point with the calculated deceleration distance, and, if it is determined that the deceleration distance is longer than the residual distance, to sequentially select a next deceleration characteristic value in the table of the storage memory.

20. The vehicle speed control apparatus of claim 12, wherein the deceleration characteristic selector is configured to issue a warning to a driver when the selected deceleration characteristic value is greater than a predetermined reference value.

\* \* \* \* \*